US010031231B2

(12) United States Patent
Zermas et al.

(10) Patent No.: US 10,031,231 B2
(45) Date of Patent: Jul. 24, 2018

(54) LIDAR OBJECT DETECTION SYSTEM FOR AUTOMATED VEHICLES

(71) Applicant: Delphi Technologies, Inc., Troy, MI (US)

(72) Inventors: Dimitris Zermas, Minneapolis, MN (US); Izzat H. Izzat, Oak Park, CA (US); Anuradha Mangalgiri, Agoura Hills, CA (US)

(73) Assignee: Delphi Technologies, Inc., Troy, MI (US)

( * ) Notice: Subject to any disclaimer, the term of this patent is extended or adjusted under 35 U.S.C. 154(b) by 179 days.

(21) Appl. No.: 15/262,467

(22) Filed: Sep. 12, 2016

(65) Prior Publication Data
US 2018/0074203 A1    Mar. 15, 2018

(51) Int. Cl.
| | |
|---|---|
| G05D 1/00 | (2006.01) |
| G01S 17/93 | (2006.01) |
| G06N 99/00 | (2010.01) |
| G06F 17/12 | (2006.01) |

(52) U.S. Cl.
CPC .......... G01S 17/936 (2013.01); G05D 1/0088 (2013.01); G06F 17/12 (2013.01); G06N 99/005 (2013.01)

(58) Field of Classification Search
USPC .......................................................... 701/27
See application file for complete search history.

(56) References Cited

U.S. PATENT DOCUMENTS

| | | | |
|---|---|---|---|
| 8,605,998 B2* | 12/2013 | Samples | G06K 9/00201 382/104 |
| 8,751,154 B2* | 6/2014 | Zhang | B60W 30/09 348/119 |
| 8,798,372 B1* | 8/2014 | Korchev | G06K 9/00637 382/195 |

(Continued)

OTHER PUBLICATIONS

Yin Huilin et al: "Spherical Coordinates Based Methods of Ground Extraction and Objects Segmentation Using 3-D LiDAR Sensor", IEEE Intelligent Transportation Systems Magazine, IEEE, USA, vol. 8, No. 1, Apr. 1, 2016, pp. 61-68.

(Continued)

*Primary Examiner* — Richard A Goldman
(74) *Attorney, Agent, or Firm* — Lawrence D. Hazelton (57) ABSTRACT

An object-detection system suitable for an automated vehicle includes a lidar and a controller. The lidar is used to detect a point-cloud that is organized into a plurality of scan-lines. The controller is in communication with the lidar. The controller is configured to classify each detected point in the point-cloud as a ground-point or a non-ground-point, define runs of non-ground-points, where each run characterized by one or multiple instances of adjacent non-ground-points in a scan-line separated from a subsequent run of one or more non-ground-points by at least one instance of a ground-point, define a cluster of non-ground-points associated with the object. The cluster is characterized by a first run from a first scan-line being associated with a second run from a second scan-line when a first point from the first run is displaced less than a distance-threshold from a second point from the second run.

1 Claim, 6 Drawing Sheets

(56) References Cited

U.S. PATENT DOCUMENTS

| | | | | |
|---|---|---|---|---|
| 8,803,966 B2 * | 8/2014 | Zhang | ................ | G06K 9/00798 |
| | | | | 348/119 |
| 9,170,334 B2 * | 10/2015 | Baldwin | ................ | G01C 21/30 |
| 9,911,340 B2 * | 3/2018 | Samarasekera | ...... | G08G 5/0069 |
| 2009/0310867 A1 * | 12/2009 | Matei | ........................ | G06T 7/11 |
| | | | | 382/195 |
| 2010/0121577 A1 * | 5/2010 | Zhang | ................ | G06K 9/00798 |
| | | | | 701/301 |
| 2017/0083763 A1 * | 3/2017 | Zang | ........................ | G06K 9/52 |
| 2018/0074203 A1 * | 3/2018 | Zermas | ................ | G01S 17/936 |

OTHER PUBLICATIONS

Zhou Ying et al: "A Fast and Accurate Segmentation Method for Ordered LiDAR Point Cloud of Large-Scale Scenes", IEEE Geoscience and Remote Sensing Letters, IEEE Service Center, New York, NY, US, vol. 11, No. 11, Nov. 1, 2014, pp. 1981-1985.

Himmelsbach M et al: "Fast segmentation of 3D point clouds for ground vehicles", Intelligent Vehicles Symposium (IV), 2010, IEEE, IEEE, Piscataway, NJ, USA, Jun. 21, 2010, pp. 560-565.

* cited by examiner

|        | $l_1$ | $l_2$ | $l_3$ |
|--------|-------|-------|-------|
| NEXT   | -1    | -1    |       |
| TAIL   | 1     | 2     |       |
| RTABLE | 1     | 2     |       |

|        | $l_1$ | $l_2$ | $l_3$ |
|--------|-------|-------|-------|
| NEXT   | -1    | -1    | -1    |
| TAIL   | 1     | 2     | 3     |
| RTABLE | 1     | 2     | 3     |

|        | $l_1$ | $l_2$ | $l_3$ |
|--------|-------|-------|-------|
| NEXT   | 2     | -1    | -1    |
| TAIL   | 2     | 2     | 3     |
| RTABLE | 1     | 1     | 3     |

LIDAR OBJECT DETECTION SYSTEM FOR AUTOMATED VEHICLES

TECHNICAL FIELD OF INVENTION

This disclosure generally relates to processing lidar point-cloud and more particularly relates to clustering non-ground-points from a lidar point-cloud into clusters. Point-cloud clustering is an important step in processing lidar point-cloud that is typically used by higher level processing such as classification and tracking of objects.

BACKGROUND OF INVENTION

Recent activity in the area of autonomous vehicle or automated vehicle operation has initiated a series of reactions that stirred the automobile industry. There is a desire for the fusion of data or information from multiple sensors in order to enhance the sensing capabilities of the host autonomous vehicles. One sensor is the lidar, which utilizes multiple laser beams to locate obstacles in its surroundings and is known for its ability to depict this information in a dense three-dimensional (3D) cloud of points. The lidar has been popular amongst academic research teams for its long range and satisfactory accuracy while recent hardware advancements that promise better performing, lower cost, and smaller scale sensors have appeared to attract the interest of the industry. Typically, the lidar is mounted on the host autonomous vehicle to provide the means to acquire a 3D representation of the surrounding environment. The challenge is to analyze it and extract meaningful information such as the number of objects, a position and a velocity of an object with respect to the vehicle, and a classification of each object such as a car, a pedestrian, a pole, etc. Similar to image processing, a first step for the analysis is the segmentation or segregation of the input data into meaningful clusters.

Prior art related to the problem of point-cloud segmentation for autonomous vehicle applications is completed in two steps. One appears to regularly utilize the concept of first removing the ground plane, and consecutively clustering the remaining points. For the first step, Himmelsbach et al. [M. Himmelsbach, F. v. Hundelshausen, and H. J. Wuensche, "Fast segmentation of 3d point-clouds for ground vehicles," in Intelligent Vehicles Symposium (IV), 2010 IEEE, June 2010, pp. 560-565] are treating the point-cloud in cylindrical coordinates and taking advantage of the distribution of the points in order to fit line segments to the point-cloud. The segments, based on some threshold of the slope are considered to capture the ground surface. In an attempt to recognize the ground surface, Moosmann et al. [F. Moosmann, O. Pink, and C. Stiller, "Segmentation of 3d lidar data in non-flat urban environments using a local convexity criterion," in Intelligent Vehicles Symposium, 2009 IEEE, June 2009, pp. 215-220] are creating an undirected graph and compare local changes of plane normals in order to characterize changes in the slope. Consecutively, the grouping of the remaining well separated non-ground points is usually treated as a clustering problem where appropriate well known clustering algorithms are employed. Examples include the Euclidean cluster extraction [R. B. Rusu, "Semantic 3d object maps for everyday manipulation in human living environments," Ph.D. dissertation, Computer Science department, Technische Universitaet Muenchen, Germany, October 2009] whose implementation can be found in the point-cloud library (PCL), DBSCAN [M. Ester, H.-P. Kriegel, J. Sander, X. Xu, et al., "A density-based algorithm for discovering clusters in large spatial databases with noise." in Kdd, vol. 96, no. 34, 1996, pp. 226-231], and MeanShift [D. Comaniciu and P. Meer, "Mean shift: A robust approach toward feature space analysis," IEEE Transactions on pattern analysis and machine intelligence, vol. 24, no. 5, pp. 603-619, 2002]. These algorithms traverse the point-cloud in an irregular way and upon finding an unlabeled point, they assign a new label which is then propagated to neighboring unlabeled points based on some rules. Inside a three dimensional space, such irregular accessing of points can lead to exhaustive search for neighbors that slow down the whole process. Although this is necessary for unorganized point-clouds, in the targeted application the layer-based organization of the point-cloud is not exploited.

SUMMARY OF THE INVENTION

Described herein is a methodology that focuses on computational speed while reducing complexity. A fast and low complexity segmentation process manages to alleviate performance constraints from proceeding computationally demanding processes, such as object classification. In the case of lidar sensors with the ability to capture 360 degrees of information, the data is represented as a set of 3D points called a point-cloud which is organized in layers. The points in each layer are also organized in an elliptical fashion and the starting points of all elliptical layers are considered to share the same orientation. The methodology described herein relies on this type of organization in the point-cloud and takes advantage of smart indexing to perform an efficient segmentation. Similar to preceding work in the same domain, our approach proposes the segmentation process to conclude in two steps: (i) the extraction of the points belonging to the ground, and (ii) the clustering of the remaining points into meaningful sets.

In accordance with one embodiment, a methodology for clustering non-ground point-cloud from scanning lidar is disclosed. The resulting clusters define potential objects in the scene and are further enclosed by bounding boxes. In general, the bounding boxes do not tightly enclose the objects. In the disclosure, the bounding boxes are treated as region of interest and further refined using an Objectness measure [Measuring the Objectness of Image Windows, IEEE Transactions on Pattern Analysis and Machine Intelligence, Volume: 34, Issue: 11, November 2012, Pages: 2189-2202] defined from camera and lidar.

In accordance with another embodiment, an object-detection system suitable for an automated vehicle is provided. The system includes a lidar and a controller. The lidar is used to detect a point-cloud indicative of an object proximate to a host-vehicle. The point-cloud is organized into a plurality of scan-lines. The controller is in communication with the lidar. The controller is configured to classify each detected point in the point-cloud as a ground-point or a non-ground-point, and define runs of non-ground-points, where each run characterized by one or multiple instances of adjacent non-ground-points in a scan-line separated from a subsequent run of one or more non-ground-points by at least one instance of a ground-point. The controller is further configured to define a cluster of non-ground-points associated with the object. The cluster is characterized by a first run from a first scan-line being associated with a second run from a second scan-line when a first point from the first run is displaced less than a distance-threshold from a second point from the second run.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which:

FIGS. 4A and 4B are examples of smart indexing: FIG. 4A when the two scan-lines have a significant difference in the number of points (Nouter is almost double Ninner), and FIG. 4B when points in both lines are missing because of noise and physical limitations of the sensor in accordance with one embodiment.

DETAILED DESCRIPTION

The following paragraphs describe in detail the complete methodology for the segmentation of a point-cloud received by a 360° coverage lidar sensor. First, a deterministic iterative multiple plane fitting technique named Ground Plane Fitting (GPF) is presented for the fast extraction of the ground points. Next is a point-cloud clustering methodology named Scan Line Run (SLR) which is directed to algorithms for connected components labeling in binary images from a lidar. Each paragraph is conceptually divided in three sections including a brief reasoning behind the algorithm selection along with the definition of new terms, the overview of the algorithm according to the pseudo-code diagrams, and discussion of algorithm implementation details.

A. Ground Plane Fitting

Cloud points that belong to the ground surface constitute the majority of a typical point-cloud from a lidar, and their removal significantly reduces the number of points involved in the proceeding computations. The identification and extraction of ground-points is suitable for this application for two main reasons: (i) the ground-points are easily identifiable since they are associated with planes, which are primitive geometrical objects with a simple mathematical models; and (ii) it is acceptable to assume that points of the point-cloud with the lowest height values are most likely to belong to the ground surface. This prior knowledge is used to dictate a set of points for the initiation of the algorithm and eliminate the random selection seen in typical plane-fit techniques such as the RANdom Sample Consensus (RANSAC), resulting in much faster convergence.

Generally, a single plane model is insufficient for the representation of the real ground surface as the ground points do not form a perfect plane and the lidar measurements introduce significant noise for long distance measurements. It has been observed that in most instances the ground surface exhibits changes in slope which need to be detected. The proposed ground plane fitting technique extends its applicability to such instances of the ground surface by dividing the point-cloud into segments along the x-axis (direction of travel of the vehicle), and applying the ground plane fitting algorithm in each one of those segments.

As depicted in the main loop of Algorithm 1, for each of the point-cloud segments the ground plane fitting starts by deterministically extracting a set of seed points with low height values which are then used to estimate the initial plane model of the ground surface. Each point in the point-cloud segment P is evaluated against the estimated plane model and produces the distance from the point to its orthogonal projection on the candidate plane. This distance is compared to a user defined threshold Thdist, which decides whether the point belongs to the ground surface or not. The points belonging to the ground surface are used as seeds for the refined estimation of a new plane model and the process repeats for Niter number of times. Finally, the ground points resulting from this algorithm for each of the point-cloud segments can be concatenated and provide the entire ground plane.

---

Algorithm 1: Pseudocode of the ground plane fitting methodology for one segment of the point-cloud. Results: Pg are points belonging to ground surface; Png are points not belonging to ground surface.

```
 1 Initialization:
 2 P : input point-cloud
 3 Niter : number of iterations
 4 NLPR : number of points used to estimate the lowest point
   representative (LPR)
 5 Thseeds : threshold for points to be considered initial seeds
 6 Thdist : threshold distance from the plane
 7 Main Loop:
 8 Pg = ExtractInitialSeeds( P; NLPR; Thseeds );
 9 for i = 1 : Niter do
10      model = EstimatePlane( Pg );
11      clear( Pg; Png );
12      for k = 1 : |P| do
13          if model( pk ) < Thdist then
14              Pg ← pk;
15          else
16              Png ← pk;
17          end
18      end
19 end
20 ExtractInitialSeeds:
21 Psorted = SortOnHeight( P );
22 LPR = Average( Psorted( 1 : NLPR ) );
23 for k = 1 : |P| do
24      if pk:height < LPR:height + Thseeds then
25          seeds ← pk
26      end
27 end
28 return( seeds );
```

---

The approach for the selection of initial seed points introduces the lowest point representative (LPR), a point defined as the average of the NLPR lowest height value points of the point-cloud. The LPR guarantees that noisy measurements will not affect the plane estimation step. Once the LPR has been computed, it is treated as the lowest height value point of the point-cloud P and the points inside the height threshold Thseeds are used as the initial seeds for the plane model estimation.

For the estimation of the plane, a simple linear model is used:

$$a^*x + b^*y + c^*z + d = 0 \qquad \text{Eq. 1A,}$$

which can be rewritten as $$\text{Trans}[N]^* X = -d; \qquad \text{Eq. 1B,}$$

where with N=Trans[a b c] and X=Trans[x y z], and solve for the normal N through the covariance matrix C∈R(3×3) as computed by the set of seed points S∈R(3), $$C = \Sigma\{i=1:|S|\}\text{Trans}[(si-sm)*(si-sm)] \quad \text{Eq. 2,}$$

where sm∈R(3) is the mean of all si∈S.

The covariance matrix C captures the dispersion of the seed points and its three singular vectors that can be computed by its singular value decomposition (SVD), describe the three main directions of this dispersion. Since the plane is a flat surface, the normal N, which is perpendicular to the plane, indicates the direction with the least variance and is captured by the singular vector corresponding to the smallest singular value. After the acquisition of N, d is directly computed from Eq. 1 by substituting X with S which is a good representative for the points belonging to the plane.

B. Scan Line Run

The remaining points Png that do not belong to the ground surface need to form or be organized into clusters to be used in higher level post processing schemes. The goal is for each point that is an element of Png (pk∈Png) to acquire a label '1' that is indicative of a cluster identity while using simple mechanisms that will ensure the fast running time and low complexity of the process.

In the case of 360° lidar sensor data, the multi-layer structure of the 3D point-cloud strongly resembles the row-wise structure of 2D images with the main differences being the non-uniform number of elements in each layer and the circular shape of each layer. The methodology treats the 3D points as pixels of an image and adapts a two-run connected component labeling technique from binary images [L. He, Y. Chao, and K. Suzuki, "A run-based two-scan labeling algorithm," IEEE Transactions on Image Processing, vol. 17, no. 5, pp. 749-756, 2008] to produce a real time 3D clustering algorithm.

A layer of points that are produced from the same lidar ring is named a scan-line. Within each scan-line, elements of the scan-line are organized in vectors of contiguous point runs. As used herein, a run is defined as the number of consecutive non-ground points in a scan line that has the same label. That is, the elements within a run share the same label and are the main building blocks of the clusters.

According to Algorithm 2 and without loss of generality, it is assumed that the point-cloud Png is traversed in a raster counterclockwise fashion starting from the top scan-line. The runs of the first scan-line are formed and each receives its own newLabel which is inherited or used for all of the point-elements in the scan-line. The runs of the first scan-line then become the runsAbove and are used to propagate their labels to the runs in the subsequent scan-line. The label is propagated to a new run when the distance between a point of the new run and its nearest neighbor in the prior scan-line above is less than Thmerge. When many points in the same run have nearest neighbors with different inheritable labels, the selected or winning label is the smallest one. On the other hand, when no appropriate nearest neighbors can be found for any of the points in the run, it receives a newLabel. The above are performed in a single pass though the point-cloud and when this is done, a second pass is performed for the final update of the point's labels and the extraction of the clusters.

Algorithm 2: Pseudocode of the scan line run clustering.
Results: labels are labels of the non ground points.

1 Initialization:
2 P : input point-cloud

Algorithm 2: Pseudocode of the scan line run clustering.
Results: labels are labels of the non ground points.

```
3  Nscanlines : number of scan lines
4  Thrun : threshold for points to belong in the same run
5  Thmerge : threshold to merge neighboring runs
6  newLabel = 1 : label identity
7  Main Loop:
8  runsAbove = FindRuns( scanline1 );
9  for i = 1 : |runsAbove| do
10      runsAbovei:label = newLabel;
11      newLabel + +;
12 end
13 for i = 2 : Nscanlines do
14     runsCurrent = FindRuns( scanlinei );
15     UpdateLabels( runsCurrent; runsAbove );
16     runsAbove = runsCurrent;
17 end
18 ExtractClusters( );
19 UpdateLabels:
20 for i = 1 : |runsCurrent| do
21     for j = 1 : |PrunsCurrenti| do
22         pNN = FindNearestNeighbor( pj ; runsAbove );
23         labelsToMerge pNN:label;
24     end
25     if isEmpty( labelsToMerge ) then
26         runsCurrenti:label = newLabel;
27         newLabel + +;
28     else
29         lR = min( labelsToMerge );
30         runsCurrenti:label = lR;
31         MergeLabels( labelsToMerge );
32     end
33 end
```

Figure 1A:
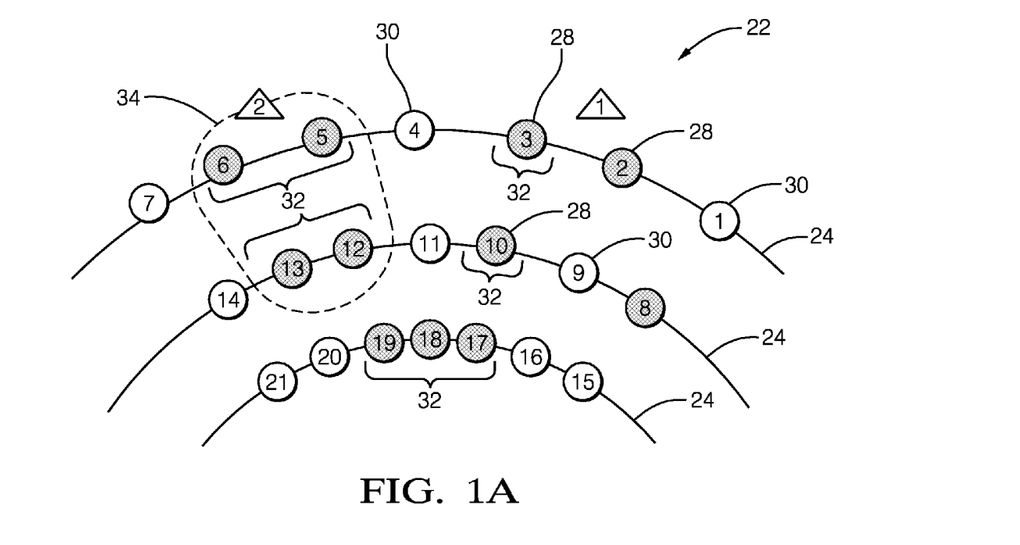
FIGS. 1A, 1B, 1C, and 1D are four stages that exemplify the processes of the Scan Run Line (SLR) clustering algorithm where circles represent points and triangles report the cluster labels in accordance with one embodiment.
Figure 1B:
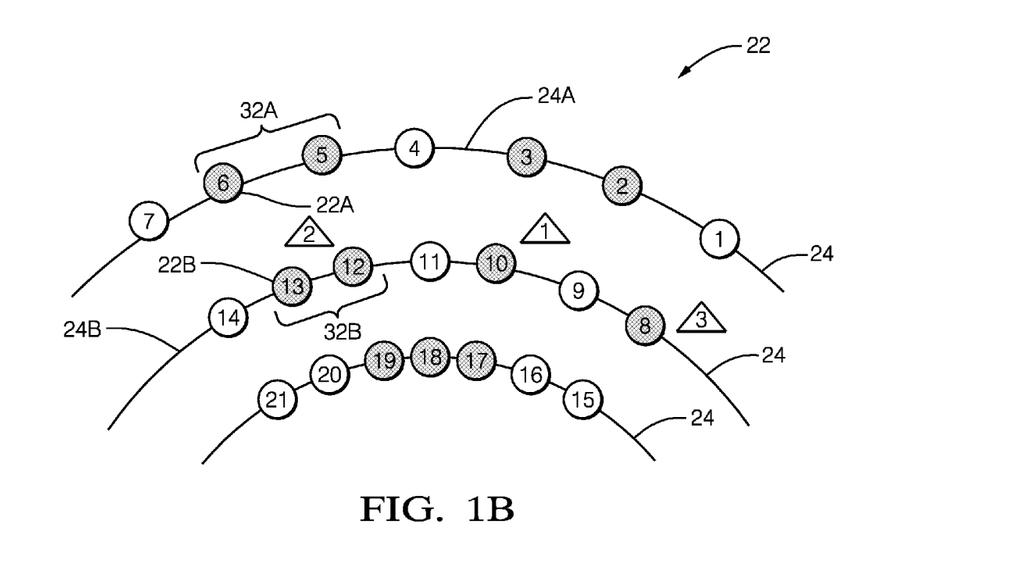
Figure 1C:
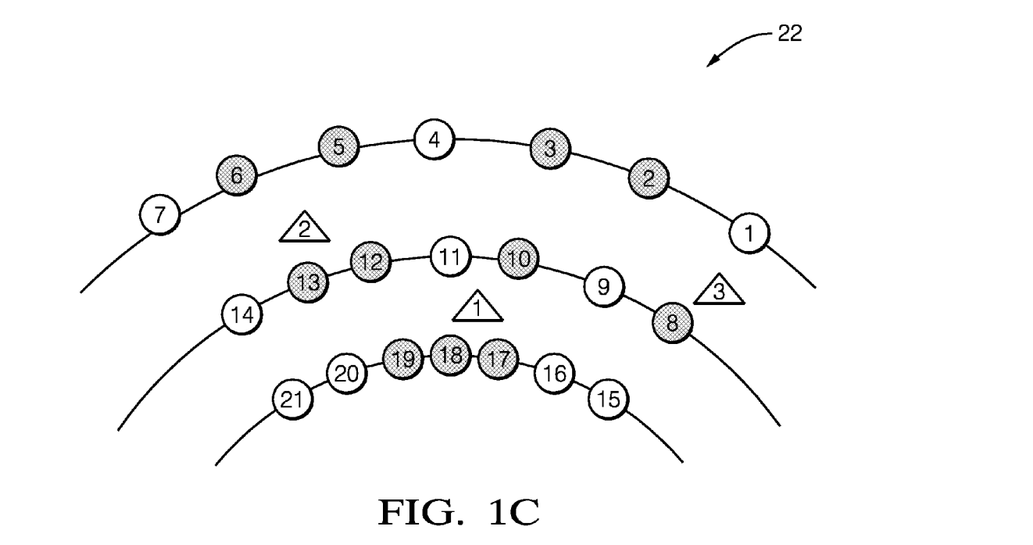
Figure 1D:
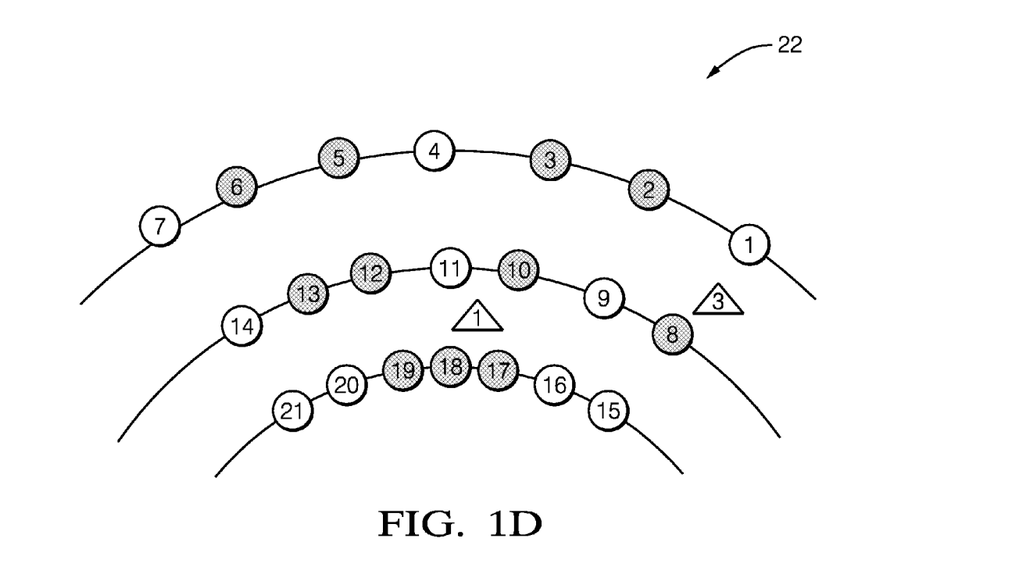

The following example with reference to accompanying FIGS. 1A and 1B covers the main instances of the methodology with the ground-points indicated by white points (numbered 1, 4, 7, 9, 11, 14, 15, 16, 20, 21) and non-ground-points indicated by gray points (numbered 2, 3, 5, 6, 8, 10, 12, 13, 17, 18, 19). The gray points (numbers 8, 10, 12, 13, 17, 18, 19) are non-ground points not yet visited. In FIG. 1A the first scan-line is initialized with two runs so non-ground-points numbered 2, 3 are assigned to run #1 (1 inside a triangle) and non-ground-points numbered 5, 6 are assigned to run#2, where the assignment to a run is indicated by a newLabel. FIG. 1B demonstrates the assignment of a new-Label and the propagation of two labels. In particular, the nearest non-ground neighbor of 8 is 2 and their distance is greater than Thmerge. In this case, labelsToMerge is empty and point 8 represents a new cluster. On the other hand, the nearest non-ground neighbor of 10 is 3 with their distance smaller than Thmerge, which makes label 1 to propagate over to point 10. Similarly, points 12 and 13 are both close to their respective neighbors 5 and 6, and based on the non-empty labelsToMerge, label 2 is assigning to them. Next, the final scan-line is considered in FIG. 1C where one run is present. Points 17 and 19 have neighbors 10 and 12 which belong to different clusters and are both appropriate to propagate their label. According to the algorithmic logic the smallest of the two labels (namely label 1) is inherited. Nevertheless, as indicated in FIG. 1D, the merging of the two labels 1 and 2 is noted and handled accordingly by the label equivalence resolving technique which is discussed below.

Figure 3A:
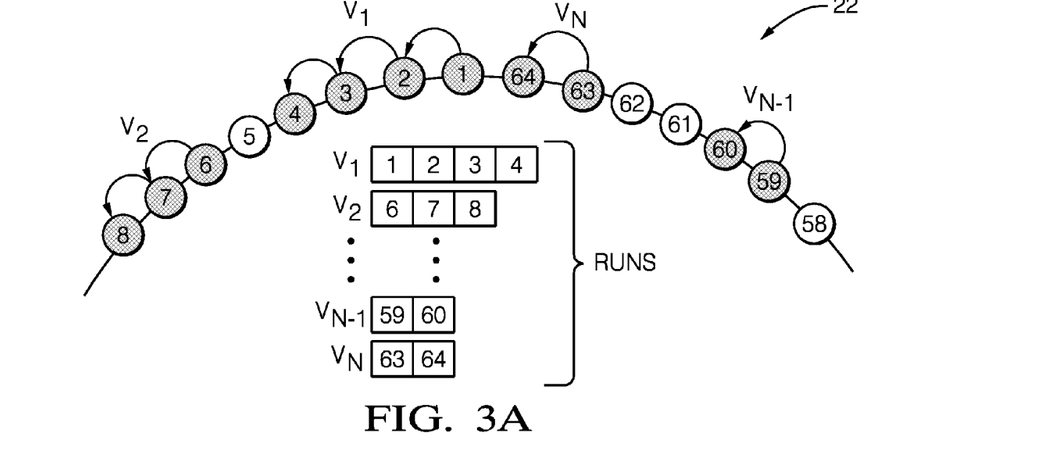
FIGS. 3A and 3B are an example of bridging the two ends of a circular scan-line in accordance with one embodiment.
Figure 3B:
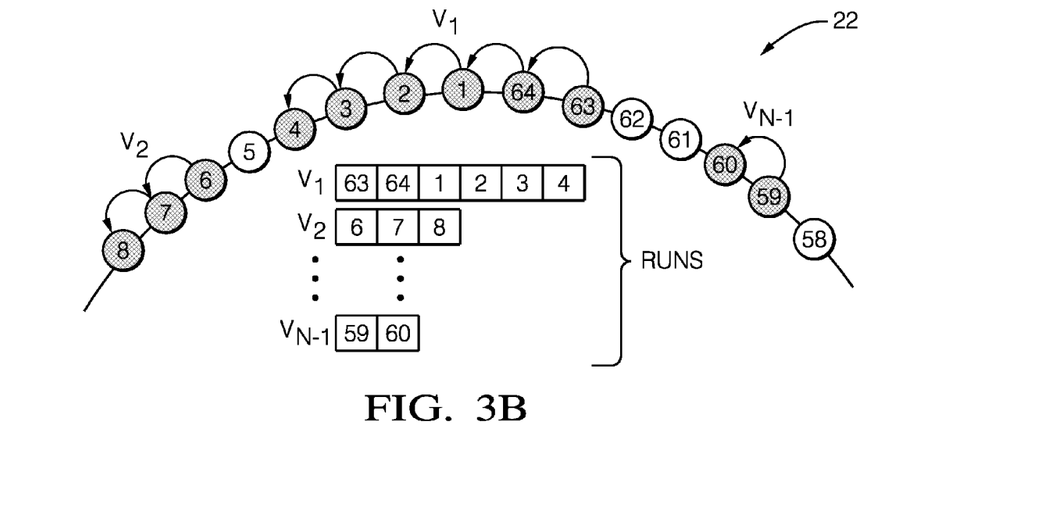

Implementation Details:

The outline of the algorithm is straight forward, but for an efficient implementation of proposed solutions on (i) how to create runs, (ii) how to look for the nearest neighbor, and (iii) how to resolve label conflicts when merging two or more connected components.

i) A run is created upon the first visit of the scan-line as a vector of indices and holds information on which consecutive points are close enough to be considered a single block inside a scan-line. Considering the circular form of the scan-lines, a run may bridge over the first and last indices. When detected, this case is resolved by attaching the indices of the ending of the scan-line at the beginning of the indices of the first run as seen in the example of FIG. 3.

ii) When the input point-cloud is expressed in polar or cylindrical coordinates with points x=[r θ z], then indexing the nearest neighbor in the scan-line above can be viewed as simply comparing θ values. In autonomous vehicle applications though, clustering is one small component of a much larger system of sensors and algorithms, and the Cartesian coordinate system is preferred for compatibility reasons. Implementation-wise, the naive solution is to build a kdtree structure with all the non-ground points in the scan-line above and use this to find each nearest neighbor, resulting in a suboptimal but viable solution that can be further refined.

Under the assumption that the points in a scan-line are evenly distributed along the whole scan-line, a smart indexing methodology is utilized that overcomes the problem of the uneven number of elements in the different scan-lines and significantly reduces the number of queries for the nearest neighbor. Assume that each scanline has Ni number of points and that each point owns two indices; one global INDg which represents its position in the whole point-cloud, and one local INDl that identifies the point inside the scanline. One can easily alternate between the indices of the scan-line K by:

$$IND lk = IND g - \Sigma\{i=0, K-1\} Ni, \text{ where } N0=0 \qquad \text{Eq. 3.}$$

Given a point index in scan-line i with local index INDli it is possible to directly find the local index of a neighbor INDlj in the close vicinity of the actual nearest neighbor in the above scan-line j by:

$$IND lj = \text{floor}[(Nj/Ni)*IND li] \qquad \text{Eq. 4,}$$

as well as computing its global index from Eq. 3.

Depending on the distribution of the points inside the scan line, the index might not indicate the nearest neighbor but a close enough point. In this case, it may be necessary to search through a number of its surrounding points for the nearest neighbor, but this number is far smaller than considering the whole scan-line.

In a run, identifying potential neighbors and searching through their surroundings for the best match results in a large overhead that undermines the performance of the algorithm. Bearing this in mind, the proposed solution is to find the nearest neighbors of the first and last points of a run via the smart indexing, form a kdtree structure with all the non-ground points within that range, and use this to search for nearest neighbors.

Figure 4A:
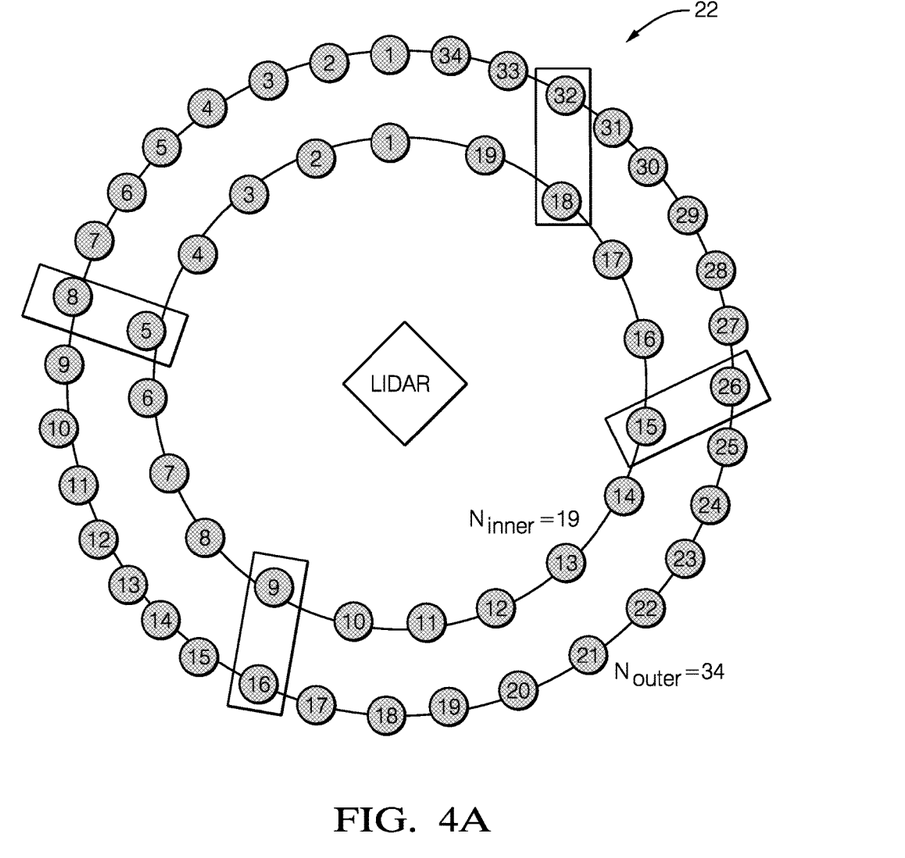
Figure 4B:
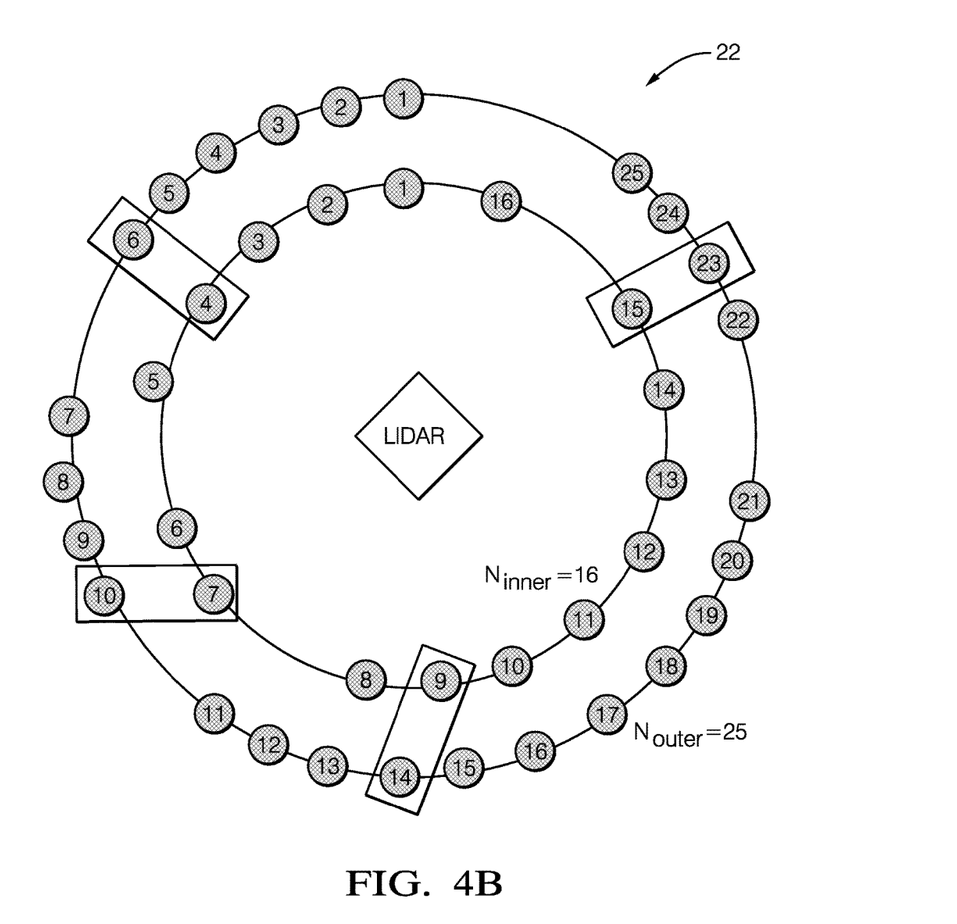

Two visual examples of the smart indexing can be seen in FIGS. 4A and 4B. In FIG. 4A, although the number of points in the two scanlines is quite different, the randomly selected points with local indices 8, 16, 26, and 32 in the outer scan-line are indicated as the nearest neighbors of the points with local indices 5, 9, 15, and 18 respectively in the inner scan-line. In addition, in FIG. 4B the distribution of points is highly uneven but smart indexing still succeeds to indicate appropriate neighbors. These cases are common to the first few scanlines when some of their laser beams never return, because of absorption or very high distance. In rare cases where the number of points between consecutive scan-lines is vastly different or a significant portion of the scan-line is missing, the smart indexing will most likely fail. In these cases, the naive solution where the whole scan-line is considered as potential nearest neighbors still produces good results.

iii) The methodology to resolve label merging conflicts is being introduced in [L. He, Y. Chao, and K. Suzuki, "A run-based two-scan labeling algorithm," IEEE Transactions on Image Processing, vol. 17, no. 5, pp. 749-756, 2008] where all the details for the implementation and deep understanding are provided. Following, a brief presentation of the essentials along with a simple example is given.

The conflicts arise when two or more different labeled components need to merge and the solution is given by adding their labels 1 in the same set S. This way, one connected component is represented by the smallest 1 in its respective S and a sophisticated collection of three vectors is used to capture their hierarchies and connections. All three vectors have the size of the number of total labels that have been created during the first pass through the point-cloud. Each entry of the first vector "next" stores the next 1 in its S and the entry for the last 1 in the S is −1. Next, the vector "tail" stores the index to the last 1 of the S. The last vector "rtable" has the assistive role of reporting what the final label of each 1 would be at any given moment. At the end of the first pass, rtable is used as the look-up table for the final labelling.

Figure 2A:
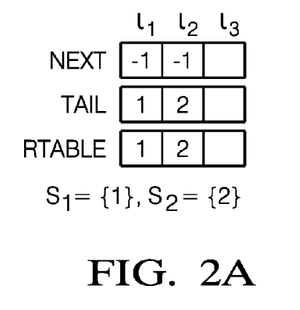
FIGS. 2A, 2B, and 2C cooperatively form an example of the label conflict resolving technique based on FIG. 1 in accordance with one embodiment.
Figure 2B:
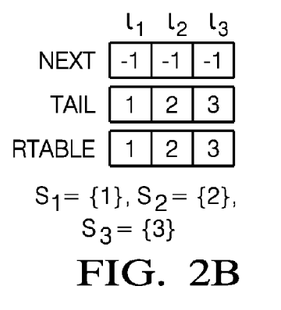
Figure 2C:
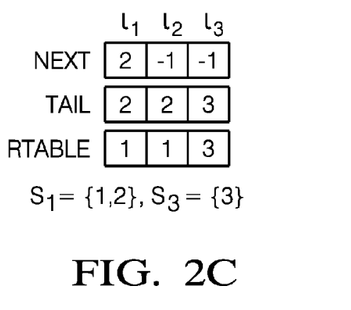

Referring now to the example formed by FIGS. 2A, 2B, and 2C from the point-view of the three vectors. In FIG. 2A two labels are created (1 and 2) and the label l1, l2 entries are filled. Each of the two sets has only one element thus next entries are both −1, tail entries show the index of the last element in the S which is 1 and 2 respectively for the two S, and rtable shows the final representative label. Next, in FIG. 2B the l3 is created and the vectors are filled the same as before. Finally, in FIG. 2C the S1 and S2 merge which means that the first entry of next will point to the index of the next element in S1, the tail for both elements in S1 is the same and points at the index of the last element of the set, and rtable is updated to properly depict the final labels.

Figure 5:
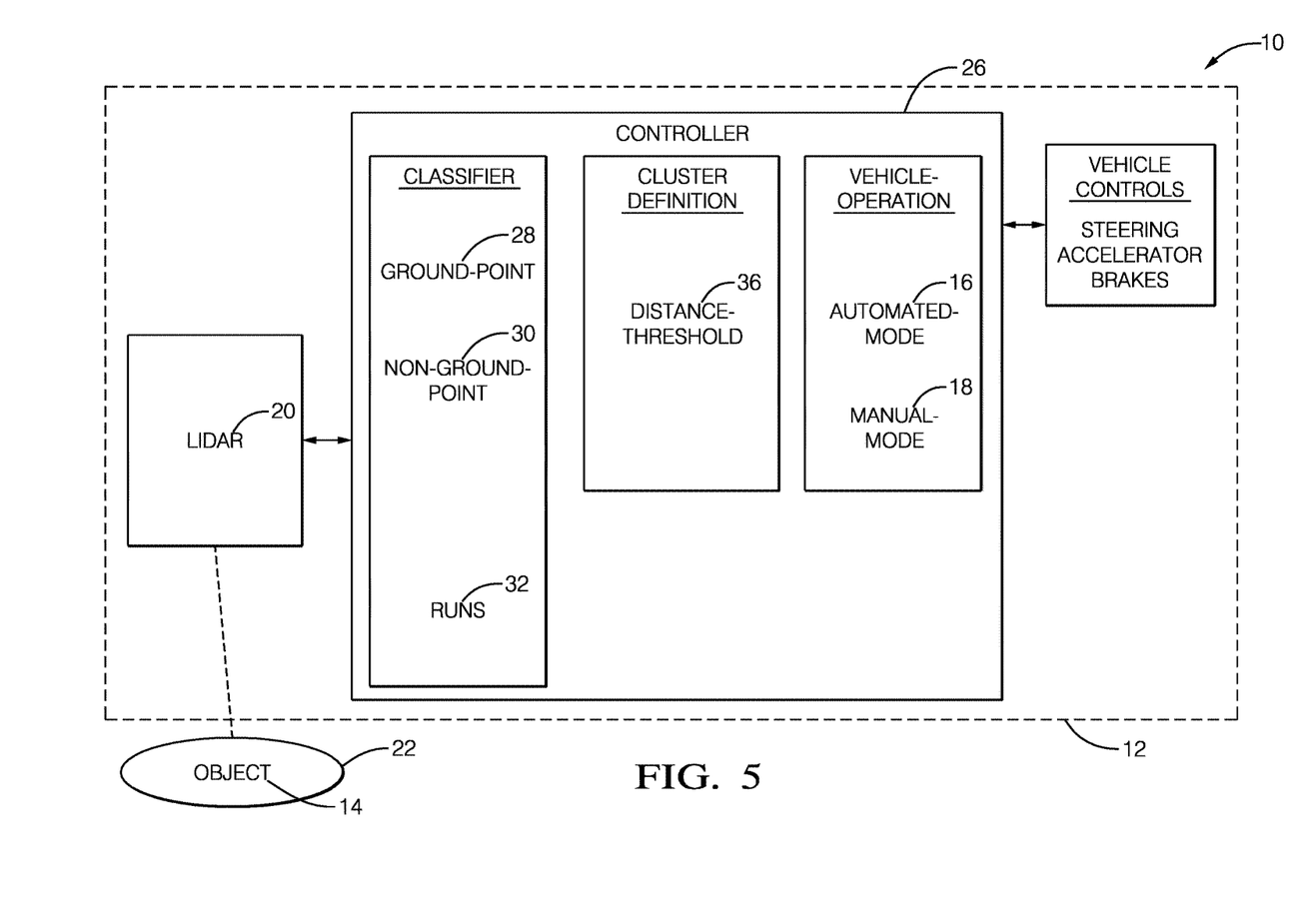
FIG. 5 is a diagram of an object detection system in accordance with one embodiment.

FIG. 5 illustrates a non-limiting example of an object-detection system 10, hereafter referred to as the system 10, which is suitable for use on an automated vehicle, a host-vehicle 12 for example. As used herein, the term 'automated vehicle' is not meant to suggest that fully automated or autonomous operation of the host-vehicle 12 is required. It is contemplated that the teachings presented herein are applicable to instances where the host-vehicle 12 is entirely manually operated by a human-operator (not shown) except for some small level of automation such as merely providing a warning to the operator of the presence of an object 14 and/or automatically operating the brakes of the host-vehicle 12 to prevent a collision with the object 14. That is, the host-vehicle 12 may be operable in an automated-mode 16 which may be a fully autonomous type of operation where the human-operator does little more than designate a destination, and/or the host-vehicle 12 may be operable in a manual-mode 18 where the human-operator generally controls the steering, accelerator, and brakes of the host-vehicle 12.

The system 10 includes a lidar 20 used to detect a point-cloud 22, see also FIGS. 1A-1D. The point-cloud 22 may be indicative of the object 14 being proximate to the host-vehicle 12. As shown in FIGS. 1A-1D and many of the figures, the point-cloud 22 is organized into a plurality of scan-lines 24. While FIGS. 1A-1D show only three instances of the scan-lines 24, this is only to simplify the drawings. That is, it is recognized that the point-cloud 22 from a typical commercially available example of the lidar

20 will provide a point-cloud with many more scan-lines, sixty-four scan-lines for example.

The system 10 includes a controller 26 in communication with the lidar 20. The controller 26 may include a processor (not specifically shown) such as a microprocessor or other control circuitry such as analog and/or digital control circuitry including an application specific integrated circuit (ASIC) for processing data as should be evident to those in the art. The controller 26 may include memory (not specifically shown), including non-volatile memory, such as electrically erasable programmable read-only memory (EEPROM) for storing one or more routines, thresholds, and captured data. The one or more routines may be executed by the processor to perform steps for determining the presence and location of the object 14 based on signals received by the controller 26 from the lidar 20 as described herein.

The controller 26 is configured to classify each detected point in the point-cloud as a ground-point 28 or a non-ground-point 30. Several methods have been proposed to distinguish the ground-points 28 from the non-ground-points 30, as will be recognized by those in the art.

The controller 26 is further configured to define runs 32 of non-ground-points 30. Each run 32 is characterized as a collection of one or multiple instances of adjacent non-ground-points in an instance of the scan-line 24 that is separated from a subsequent run 32 of one or more non-ground-points 30 by at least one instance of a ground-point 28. That is, each instance of a run 32 is defined by one or more instance of the non-ground-points 30 that are next to each other (i.e. adjacent to each other) without an intervening instance of a ground-point 28.

The controller 26 is further configured to define a cluster 34 of non-ground-points associated with the object 14. If multiple objects are present in the field-of-view of the lidar 20, there may be multiple instances of point-clouds 34 in the point-cloud 22. A cluster 34 may be characterized by or include a first run 32A (FIG. 1B) from a first scan-line 24A being associated with a second run 32B from a second scan-line 24B when a first point 22A from the first run 32A is displaced less than a distance-threshold 36 (see 'Thmerge' above) from a second point 22B from the second run 32B.

Accordingly, an object-detection system (the system 10), a controller 26 for the system 10, and a method of operating the system 10 is provided. The process of organizing the non-ground-points 30 into runs 32, and then associating nearby runs 32 into clusters 34 makes for an efficient way to process the point-cloud data from the lidar 20.

While this invention has been described in terms of the preferred embodiments thereof, it is not intended to be so limited, but rather only to the extent set forth in the claims that follow.

We claim:

1. An object-detection system suitable for an automated vehicle, said system comprising:
    a lidar used to detect a point-cloud indicative of an object proximate to a host-vehicle, said point-cloud organized into a plurality of scan-lines;
    a controller in communication with the lidar, said controller configured to
    classify each detected point in the point-cloud as a ground-point or a non-ground-point,
    define runs of non-ground-points, each run characterized by one or multiple instances of adjacent non-ground-points in a scan-line separated from a subsequent run of one or more non-ground-points by at least one instance of a ground-point,
    define a cluster of non-ground-points associated with the object, said cluster characterized by a first run from a first scan-line being associated with a second run from a second scan-line when a first point from the first run is displaced less than a distance-threshold from a second point from the second run.

* * * * *